US008740242B2

(12) United States Patent
Slomp

(10) Patent No.: US 8,740,242 B2
(45) Date of Patent: Jun. 3, 2014

(54) POSTERIOR WALKER

(75) Inventor: Flo Slomp, Edmonton (CA)

(73) Assignee: Biovar Corporation, Edmonton (CA)

( * ) Notice: Subject to any disclaimer, the term of this patent is extended or adjusted under 35 U.S.C. 154(b) by 0 days.

(21) Appl. No.: 13/248,809

(22) Filed: Sep. 29, 2011

(65) Prior Publication Data

US 2013/0082454 A1 Apr. 4, 2013

(51) Int. Cl.

| | |
|---|---|
| ***B62B 11/00*** | (2006.01) |
| ***B26B 11/00*** | (2006.01) |
| ***B26B 3/02*** | (2006.01) |

(52) U.S. Cl.

CPC .. *B26B 11/00* (2013.01); *B26B 3/02* (2013.01)
USPC ...... 280/638; 280/87.051; 280/639; 280/648; 280/87.05; 280/250.1; 280/87.021; 280/87.041; 280/47.34; 135/71; 135/67; 482/68

(58) Field of Classification Search

USPC ........................ 280/87.051, 639, 648; 135/71
See application file for complete search history.

(56) References Cited

U.S. PATENT DOCUMENTS

| | | | | |
|---|---|---|---|---|
| 612,278 | A * | 10/1898 | Schlunz | 108/50.16 |
| 4,748,994 | A * | 6/1988 | Schultz et al. | 135/67 |
| 5,224,717 | A * | 7/1993 | Lowen | 280/1.5 |
| 5,364,120 | A * | 11/1994 | Shimansky | 280/650 |
| 5,538,268 | A * | 7/1996 | Miller | 280/87.05 |
| 5,555,904 | A * | 9/1996 | Stockwell | 135/68 |
| 5,564,451 | A * | 10/1996 | Hagberg | 135/68 |
| 5,702,326 | A * | 12/1997 | Renteria | 482/68 |
| 6,311,708 | B1 * | 11/2001 | Howle | 135/67 |
| 6,343,802 | B1 * | 2/2002 | Workman et al. | 280/87.041 |
| 6,837,503 | B2 * | 1/2005 | Chen et al. | 280/87.021 |
| 7,347,215 | B1 * | 3/2008 | Birnbaum | 135/66 |
| 7,494,138 | B2 * | 2/2009 | Graham | 280/87.021 |
| 7,669,863 | B2 * | 3/2010 | Steiner et al. | 280/87.05 |
| 2002/0038942 | A1 * | 4/2002 | Gilles et al. | 280/87.051 |
| 2004/0118640 | A1 * | 6/2004 | Hallgrimsson | 188/2 F |
| 2008/0121259 | A1 * | 5/2008 | Weaver | 135/67 |
| 2009/0224499 | A1 * | 9/2009 | Dashew et al. | 280/87.05 |

FOREIGN PATENT DOCUMENTS

| | | | |
|---|---|---|---|
| EP | 2289478 | A1 * | 3/2011 |

* cited by examiner

*Primary Examiner* — J. Allen Shriver, II
*Assistant Examiner* — Hilary L Johns
(74) *Attorney, Agent, or Firm* — Bennett Jones LLP

(57) ABSTRACT

A posterior walker has an anteriorly open, wheeled frame having a transverse posterior structural member, a left and right forearm support member attached to the frame, and adapted to be aligned with the forearms of a user at an angle wherein the user's wrist is lower than the elbow, and left and right hand grips associated with the left and right forearm support member.

5 Claims, 7 Drawing Sheets

POSTERIOR WALKER

FIELD OF THE INVENTION

The present invention relates to a posterior walker.

BACKGROUND OF THE INVENTION

Walkers provide people with some mobility impairment to walk in an upright position by providing a support while allowing movement, typically in the forward direction. A conventional prior art walker is shown in FIG. 1. This form of walker is wheeled and has handles for the user at a suitable height for the user. It is a rear-entry walker given that a horizontal structural member is positioned in front of the user.

A conventional walker, even when properly adjusted for height, does not encourage good posture or spinal alignment. A user will typically bend over or stoop to put weight on the handles. After prolonged use, the user's back muscles adapt and stiffen into the hunched posture, which reduces the user's strength and mobility. As a result, the user becomes ever more dependent on the walker, entering a downward spiral of mobility and strength decline.

There is a need in the art for a walker which mitigates the difficulties in the prior art, and specifically assists a user in achieving a neutral spine during use.

SUMMARY OF THE INVENTION

The present invention relates to a posterior walker, configured to encourage a neutral spine during use.

In one embodiment, the posterior walker comprises:

(a) an anteriorly open wheeled frame having an posterior structural member;

(b) a left and right forearm support member, each attached to the frame, and each adapted to be aligned with the forearms of a user at an angle wherein the user's wrist is lower than the elbow;

(c) a left hand grip and a right hand grip associated with the left and right forearm support members respectively.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF EMBODIMENTS OF THE INVENTION

The invention relates to a posterior walker. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

As used herein, the phrase "posterior walker" indicates a walker which is open anteriorly of the user, and closed posteriorly. An anterior walker presents a barrier in front of the user. In contrast, the frame (10) of a posterior walker wraps around the posterior and two sides of a user.

Figure 4A:
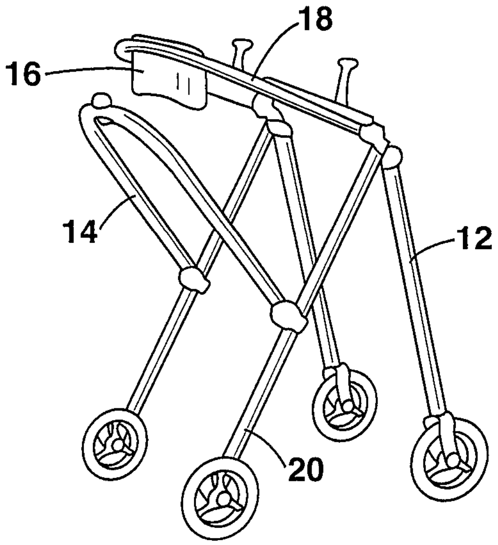
FIG. 4A-4C shows one embodiment of a folding frame.
Figure 4B:
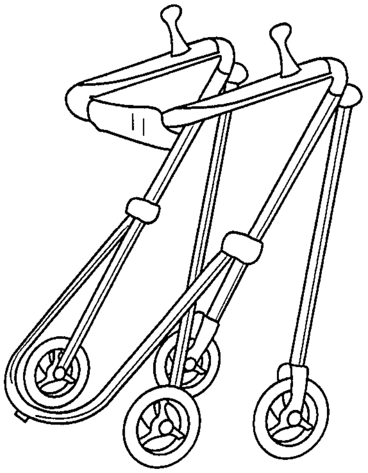
Figure 4C:
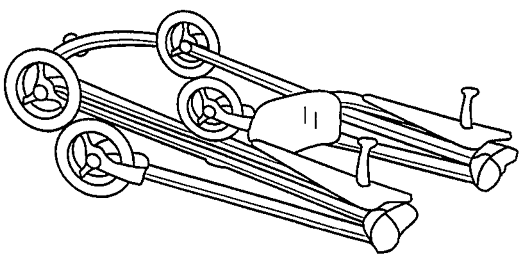

In one embodiment, the frame comprises a pair of front frame members (12), a U-shaped posterior frame member (14) including a tranverse posterior support (16), a U-shaped connecting member (18) which connects the front frame members to the posterior frame member and/or posterior support (16), a pair of trailing members (20) which extend downwards beneath the connecting members and the posterior frame member (14). The configuration of the frame and specific members which make up the frame are not essential to the present invention, unless specifically recited in a claim. Various members and interconnections may be designed without departing from the inventive concept. Some designs may optimize robustness, others may optimize weight reduction and folding capability. As may be seen in FIGS. 4A-C, the frame may be designed with hinged joints to fold up, making the walker conveniently more portable.

Figure 2:
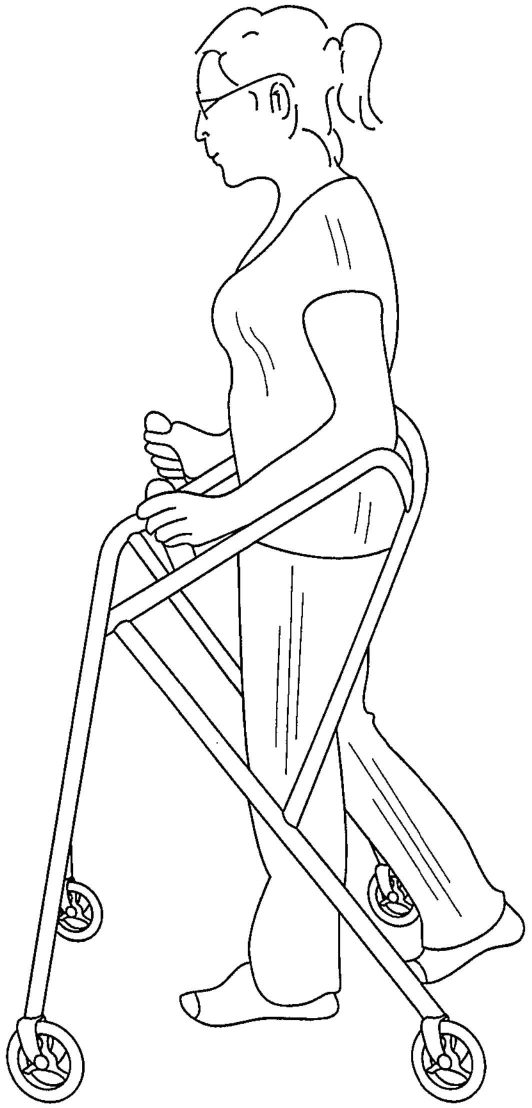
FIG. 2 shows one embodiment of a posterior walker of the present invention.
Figure 3:
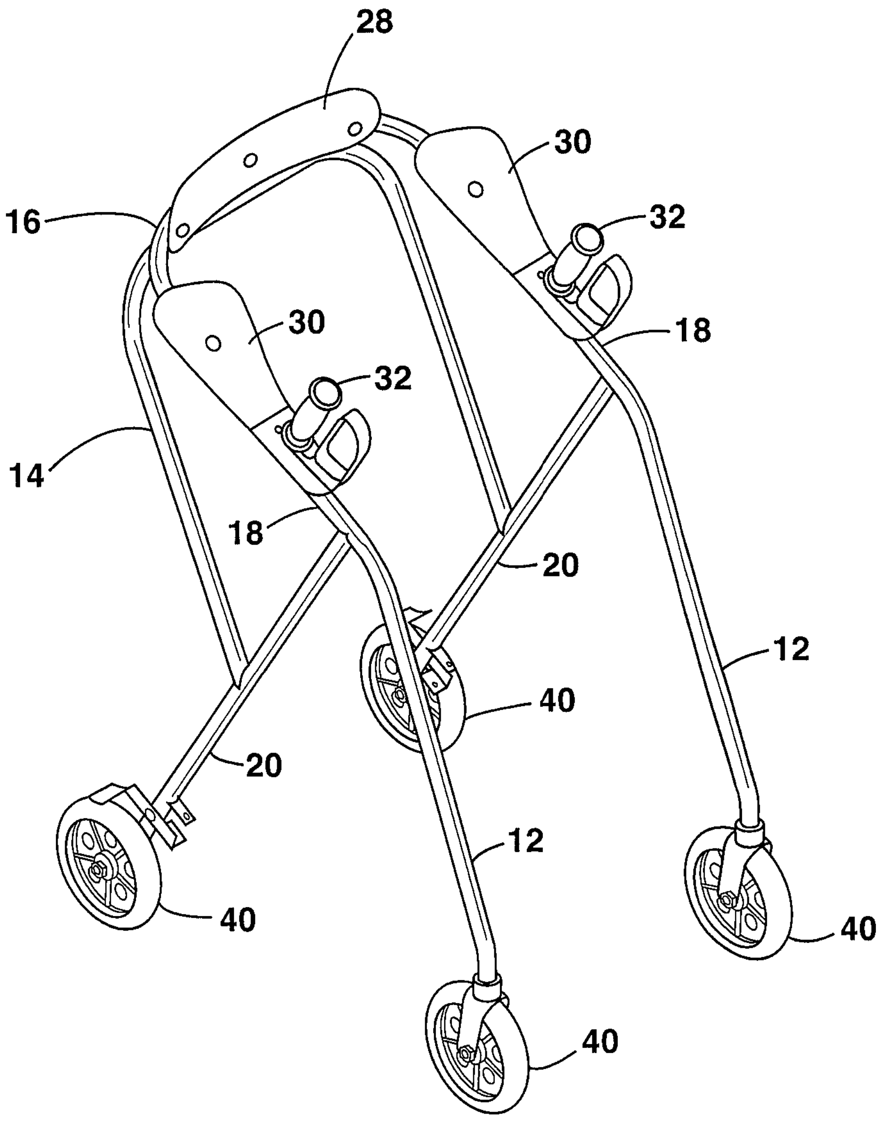
FIG. 3 shows a pictorial view of one embodiment of a posterior walker.

The posterior walker of the present invention encourages a user to achieve a neutral spine position by supporting the user's forearms at a suitable height, and at a downward angle, as may be seen in FIG. 2. As used herein, a "neutral spine" means a spine which is in its natural curved "S" shape at rest. Whether or not a spine is in its neutral position may be measured by the load supported by erector spinae muscle group which originates at the sacrum and lumbar region, and attaches to the ribs, vertebrae and the base of the skull. A spine in its neutral position minimizes the strain on the erector spinae muscles.

Therefore, in one embodiment, the frame (10) supports a left and right forearm support member (30), each adapted to be aligned with the forearms of a user at an angle wherein the user's wrist is lower than the elbow. Each forearm support member may preferably be an elongate U-shaped member which cradles a user's forearms. A left and right hand grip (32) is disposed at the distal end of each forearm support member (30), and is shaped and configured to be held comfortably when the user's forearms are positioned in the forearm support members. In one embodiment, the hand grips may comprise a pistol grip (32) which extends upwards, at about a 120° angle from horizontal and substantially perpendicular to the forearm support member (30).

Figure 1:
FIG. 1 PRIOR ART
FIG. 1 (prior art) shows a conventional prior art anterior walker.

The configuration of the hand grips (32) assist the user in maintaining a neutral spine. In a convention walker, the hands grip the walker in an overhand grip, such that the user's wrists are in flexion. As seen in FIG. 1, if the user's wrists are in a neutral position, the upper body tends to hunch over to compensate. If the upper body is more upright, the wrists will be forced into flexion. In the present invention, the hand grips are configured as pistol grips, at a natural angle from the forearm supports, which supports and encourages a neutral spine position. In this position, the wrists are not in a flexion or extension position, and accordingly, there is no or little radial or ulnar nerve deviation.

A backrest (28) may be provided on the posterior support (16), which aids the user in maintaining a neutral spine. When the user's forearms are properly placed, and the user's back rests lightly against the backrest (28), there is a greater likelihood of the user achieving a neutral spine.

Figure 5:
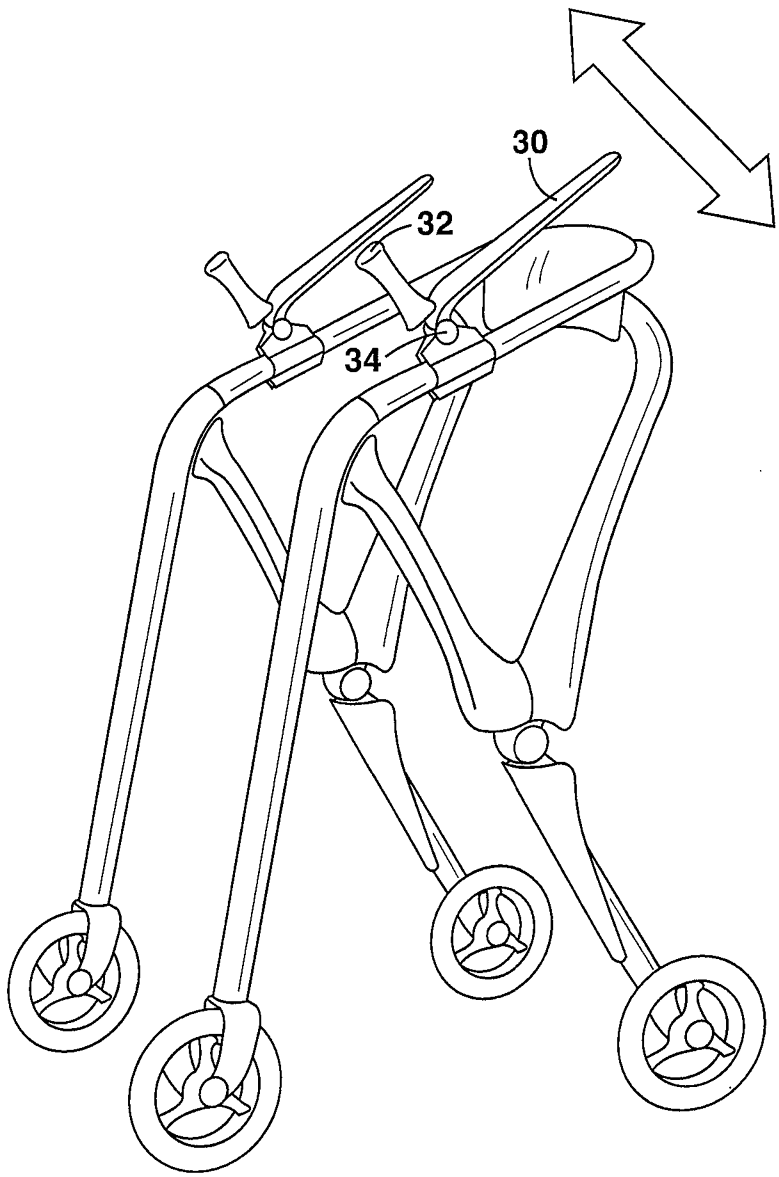
FIG. 5 shows another adjustable forearm support member.

As may be seen in FIG. 5, each forearm support member (30) may be pivotally attached to the frame such that the angle of the forearm support member (30) from the horizontal plane (up and down) may be adjusted.

Figure 6:
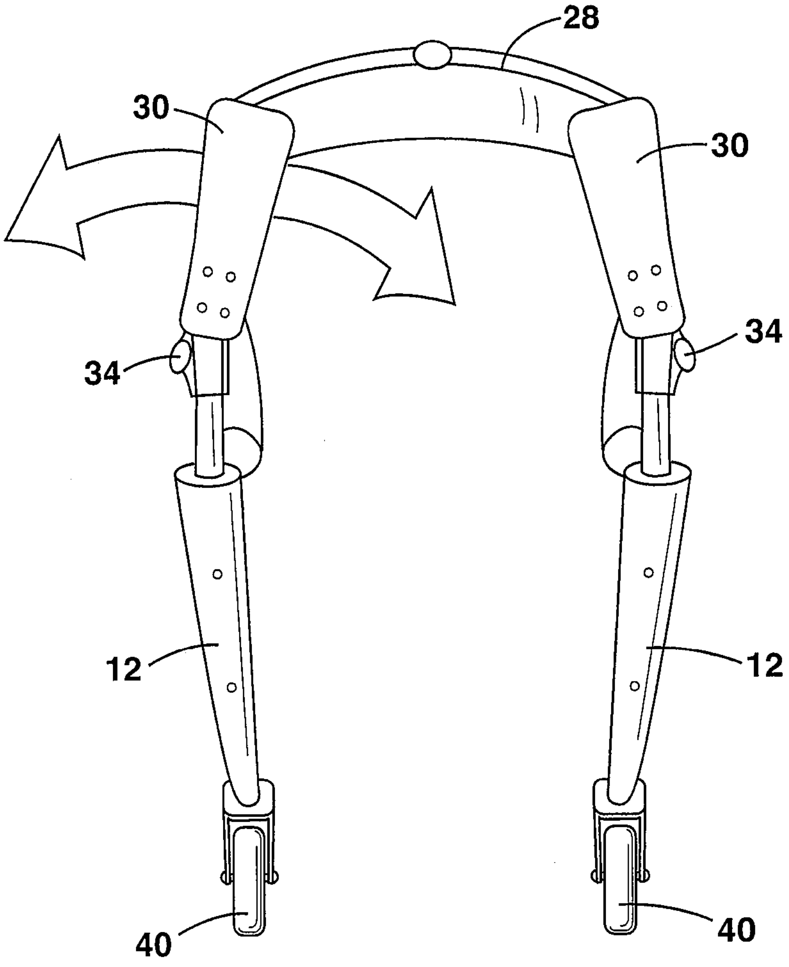
FIG. 6 shows another adjustable forearm support member.

As may be seen in FIG. 6, each forearm support member (30) may be pivotally attached to the frame such that the angle of the forearm support member (30) from the longitudinal axis (L) of the walker may be adjusted (side to side). In one embodiment, the pivoting attachment may comprise a ball and socket joint (34), which may permit movement in any direction.

Each of the front frame members and the trailing members provides a ground-engaging wheel (40), and may be telescopically adjustable to accommodate different user height.

Figure 7:
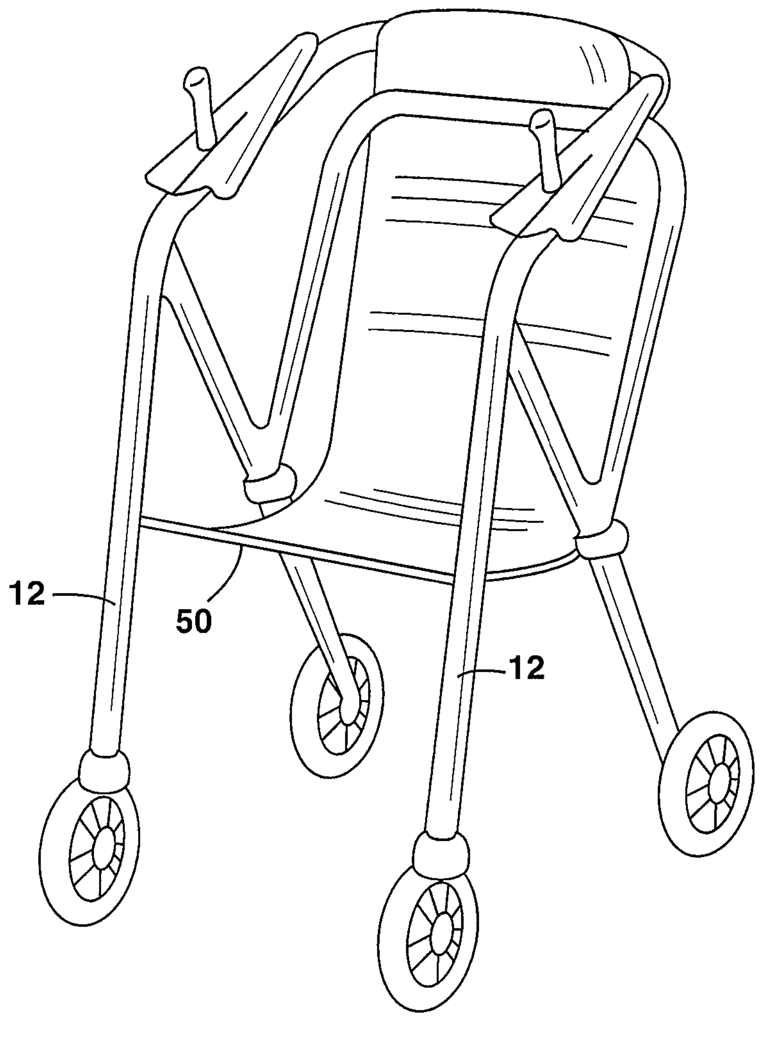
FIG. 7 shows a walker having a removable seat.

As some walkers have seats incorporated into them, the option of a seating surface may be accommodated by providing a seat (50) which may removeably attach to the front frame members (12), as shown in FIG. 7. In one embodiment, the seat (50) may be moveable to a position which permits ordinary use of the walker.

The invention claimed is:

1. A posterior walker comprising:

(a) an anteriorly open, wheeled frame having a posterior structural member wrapping around the posterior and two sides of a user with a backrest at the height of the lumbar region of the user attached thereto;

(b) a left and right forearm support member attached to the posterior structural member at the height of the backrest and angled downward from horizontal, and adapted to be aligned with the forearms of a user wherein the user's wrist is lower than the elbow; and (c) a left and right hand grip associated with the left and right forearm support member, wherein each of the left and right hand grips projects upwardly and substantially perpendicular to its respective forearm support member, and wherein the user walking upright connects lumbarly with the backrest achieving a neutral spine.

2. The posterior walker of claim 1 wherein the frame comprises telescoping segments allowing height adjustment of the walker.

3. The posterior walker of claim 1 wherein each forearm support member is angled at about 25° to about 45° downward from horizontal.

4. The posterior walker wherein the each forearm support member is angled at about 30° downward from horizontal.

5. The posterior walker of claim 1 wherein each forearm support member is pivotally attached to the posterior structural member, allowing radial adjustment from side to side.

* * * * *